United States Patent
Harms et al.

(10) Patent No.: US 7,918,348 B2
(45) Date of Patent: Apr. 5, 2011

(54) FILTER DEVICE AND METHOD FOR THE PERIODIC CLEANING OF A FILTER

(75) Inventors: Eberhard Harms, Muppert (DE); Mark Grigo, Soest (DE)

(73) Assignee: Utisol Technologies AG, Zug (CH)

( * ) Notice: Subject to any disclaimer, the term of this patent is extended or adjusted under 35 U.S.C. 154(b) by 1328 days.

(21) Appl. No.: 10/554,045

(22) PCT Filed: Apr. 23, 2004

(86) PCT No.: PCT/CH2004/000247
§ 371 (c)(1),
(2), (4) Date: Feb. 23, 2006

(87) PCT Pub. No.: WO2004/094034
PCT Pub. Date: Nov. 4, 2004

(65) Prior Publication Data
US 2006/0231478 A1    Oct. 19, 2006

(30) Foreign Application Priority Data

Apr. 24, 2003  (EP) .................................... 03405289

(51) Int. Cl.
| | | |
|---|---|---|
| C02F 3/06 | (2006.01) | |
| C02F 3/12 | (2006.01) | |
| C02F 11/12 | (2006.01) | |
| B01D 33/06 | (2006.01) | |
| B01D 33/073 | (2006.01) | |
| B01D 36/04 | (2006.01) | |

(52) U.S. Cl. ........ 210/402; 210/780; 210/784; 210/797; 210/202; 210/297; 210/299

(58) Field of Classification Search .................. 210/780, 210/784, 797, 202, 402, 297, 299
See application file for complete search history.

(56) References Cited

U.S. PATENT DOCUMENTS

| | | | | |
|---|---|---|---|---|
| 1,796,491 | A | * | 3/1931 | Sweetland .................... 210/142 |
| 1,796,492 | A | * | 3/1931 | Sweetland et al. ............ 210/327 |
| 1,858,900 | A | * | 5/1932 | Moore .......................... 210/196 |
| 3,489,679 | A | * | 1/1970 | Forrest et al. ............ 210/748.05 |
| 4,090,965 | A | * | 5/1978 | Fuchs .......................... 210/151 |
| 4,123,362 | A |   | 10/1978 | Mansouri |
| 4,639,315 | A | * | 1/1987 | Fuchs et al. ................. 210/333.1 |
| 5,362,401 | A | * | 11/1994 | Whetsel ....................... 210/741 |
| 5,876,612 | A | * | 3/1999 | Astrom ........................ 210/741 |

FOREIGN PATENT DOCUMENTS

| | | |
|---|---|---|
| DE | 568 537 C | 1/1933 |
| DE | 11 98 751 B | 8/1965 |
| DE | 22 61 203 A | 7/1973 |
| DE | 195 37 578 A1 | 4/1997 |
| JP | 06285308 A * | 10/1994 |

* cited by examiner

*Primary Examiner* — Thomas M Lithgow
(74) *Attorney, Agent, or Firm* — Rankin, Hill & Clark LLP

(57) ABSTRACT

In a filter device and in a method for the periodic cleaning of a filter of a water treatment or sewage treatment plant, a rotating filter is arranged within its own separate filter chamber, the bottom of which is designed as following a contour of the rotating filter. The provision of an own separate filter chamber makes it possible for the rotating filter to be cleaned, without other parts of a filtering installation having to be taken out of operation, and without the rotating filter having to be dismantled and removed from the filter chamber. Therefore no lifting cranes or separate cleaning basins are necessary.

9 Claims, 2 Drawing Sheets

FILTER DEVICE AND METHOD FOR THE PERIODIC CLEANING OF A FILTER

BACKGROUND OF THE INVENTION

The invention is related to the field of filtration technology and in particular to a filter device and to a method for the periodic cleaning of a filter for a water treatment—or sewage treatment plant.

STATE OF THE ART

In filtration plants for sewage or drinking water, stationary filter disks or filter disks or filter lamellae arranged to rotate are utilised, which typically are equipped with diaphragm filters. A multitude of filter lamellae forms a filter unit. Rectangular filter lamellae, for example, are combined to form cuboid-shaped filter units, or trapeze-shaped or circular segment-shaped lamellae are combined to form a cylindrical arrangement. In EP-B-1 149 619 a filter device is disclosed, in which stacks are formed out of segment-shaped filter lamellae, and these stacks in turn are combined to form an essentially cylindrical rotating filter. The rotating filter is operated submerged in a basin with the water to be treated, for example, in an activated sludge basin containing sewage. Despite various precautionary measures for the prevention of the deposition of dirt on the filters, a periodic cleaning of the filter units is necessary. In doing so, the filter units, for example, a complete rotating filter or individual segments are lifted out of the basin with lifting cranes and transported into a cleaning basin. The cleaning basin is filled with a cleaning solution, which brings about a chemical cleaning of the filter diaphragms. In addition, a rough manual mechanical cleaning, for example, by hosing down takes place. The procedure described is elaborate and time-consuming.

BRIEF SUMMARY OF THE INVENTION

For this reason, it is the object of the invention to create a filter device and a method for the periodic cleaning of a filter for a water treatment—or sewage treatment plant of the type mentioned above, which eliminates the disadvantages of prior art.

In the filter device in accordance with the invention, a rotating filter is arranged within its own separate filter chamber, the bottom of which is designed to have the same shape as a contour of the rotating filter. The bottom therefore encompasses the rotating filter, so that the volume enclosed by the bottom is significantly smaller than in the case of a conventional, essentially cuboid-shaped bottom of a basin. The smallest volume is achieved, when the bottom has the shape of a sector of a cylindrical hollow body, preferably approximately the shape of half a cylindrical hollow body. In order to assure that the rotating filter can be assembled, an internal radius of the cylindrical hollow body, is for example 5 to 10% larger than an external radius of the rotationally symmetrical rotating filter.

The rotating filter is arranged within its own separate filter chamber, therefore not within the main basin or within the main activated sludge basin of a sewage treatment plant, respectively. Due to the fact that a separate filter chamber is present, it is possible to clean the rotating filter in situ, without having to take other components of a filtration installation out of operation and without having to dismantle the rotating filter and to remove it from the filter chamber. For this reason, neither lifting cranes nor separate cleaning basins are required. Complications resulting from the disconnecting and subsequent reconnecting of conduits and lines are eliminated. In addition, also the positioning during the re-installation of the cleaned filters in the activated sludge basin of the operational plant is eliminated. Furthermore, on the basis of the shape of the bottom of the filter chamber, less cleaning liquid is required. By the rotation of the rotating filter during the cleaning operation, even less cleaning liquid is necessary, and in addition the rotating filter is also much more accessible for a manual pre-cleaning or rough cleaning.

With the method for the periodic cleaning of filter device, i.e., in particular the rotating filter, the water present in the filter chamber is drained or pumped out, the filter chamber is thereupon filled with cleaning liquid up to approximately a little below the middle of the rotating filter and a chemical cleaning is carried out while the rotating filter is rotated. Between the draining of the water and the filling with the cleaning liquid, the mechanical rough cleaning of the rotating filter is carried out with the filter under rotation.

In a preferred embodiment of the invention, the filter chamber is connected with a main basin, for example, with an activated sludge basin of a water treatment plant through a pump, otherwise, however, it is separated from the main basin, and respectively, from the other basins of the installation. The main basin as well as the filter chamber and the separating wall in preference are made out of brickwork and/or out of concrete. The pump pumps water into the filter chamber through a conduit and over a first overflow, which is located above an operating level of the filter chamber. Over a second overflow, which defines an operating level of the filter chamber, the water flows back into the main basin. For emptying the filter chamber for the purpose of periodic cleaning, only the pump has to be switched-off and the filter chamber has to be emptied by means of, for example, an auxiliary pump and a hose and/or through a draining conduit. A separation of the filter chamber from the other water conducting parts of the installation in this case is achieved by switching-off the pump. Establishing connections with the other water conducting parts of the installation takes place by switching-on the pump.

The cleaning installation as a whole therefore comprises a main basin and at least one filter chamber separated from this main basin as well as means for achieving a circulation of liquid from the main basin into the at least one filter chamber and back. In preference, these means of circulation conduct the liquid directly, that is without any significant intermediate reservoirs, from the main basin into the at least one filter chamber and also directly back again.

The terms "water" or "dirty water" in the application represent sewage or drinking water to be treated. In principle the invention is also utilisable for filtration installations for other types of liquid, the advantages of the in situ cleaning, however, are particularly pronounced in the case of the large and heavy filters utilised for water treatment processes.

Further preferred embodiments follow from the dependent claims. In this, the elements and characteristics of the claims concerning the method can be combined in their general meaning with the claims concerning the device and vice versa.

BRIEF DESCRIPTION OF THE DRAWINGS

In the following, the object of the invention is explained in more detail on the basis of an example of a preferred embodiment, which is illustrated in the attached drawings. These drawings depict.

Figure 1:
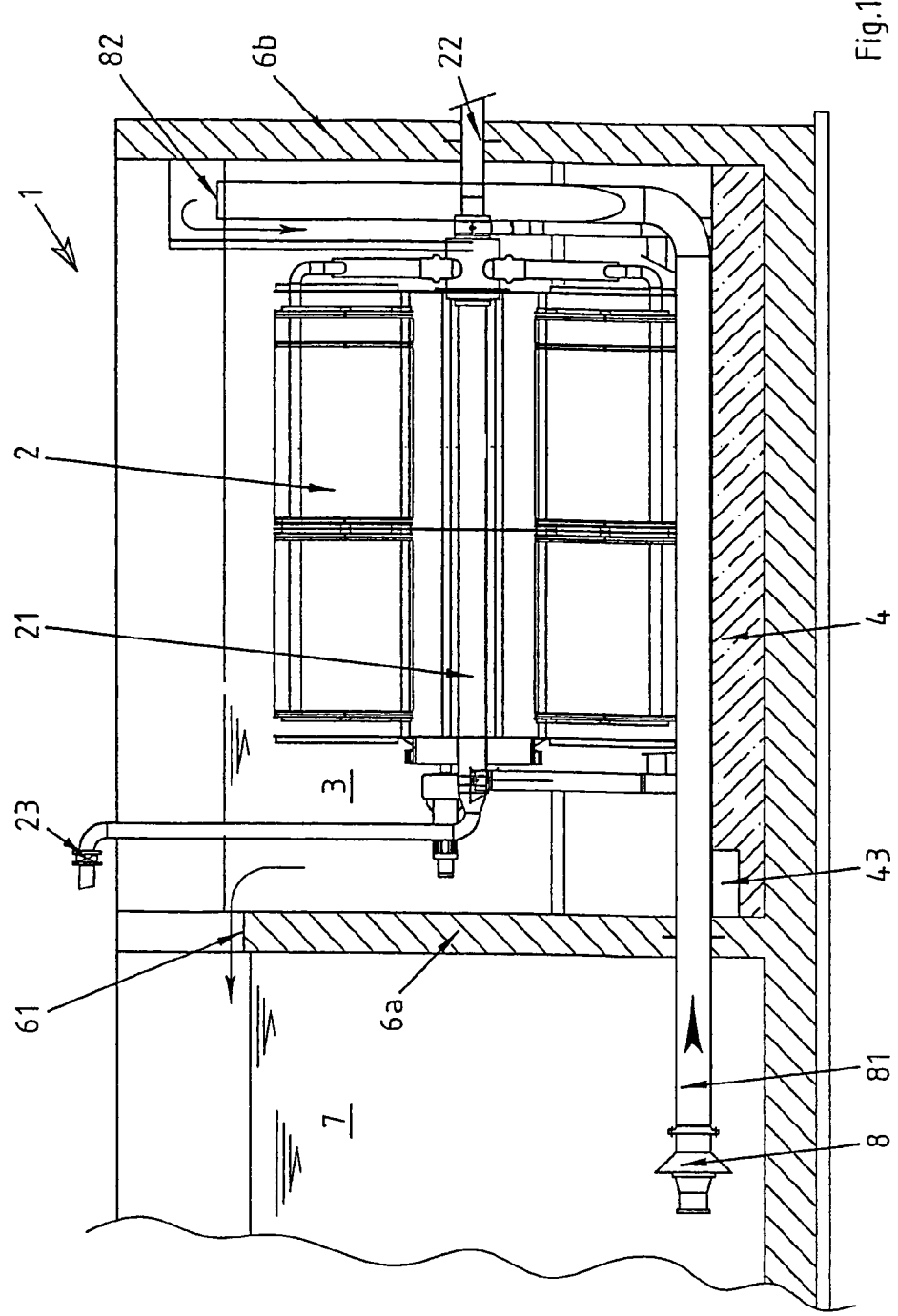
FIG. 1 a side view parallel to an axis of rotation.

The reference marks utilised in the drawings and their significance are listed in summary in the list of reference marks. In principle in the figures the same components are identified with the same reference marks.

DETAILED DESCRIPTION OF THE INVENTION

Figure 2:
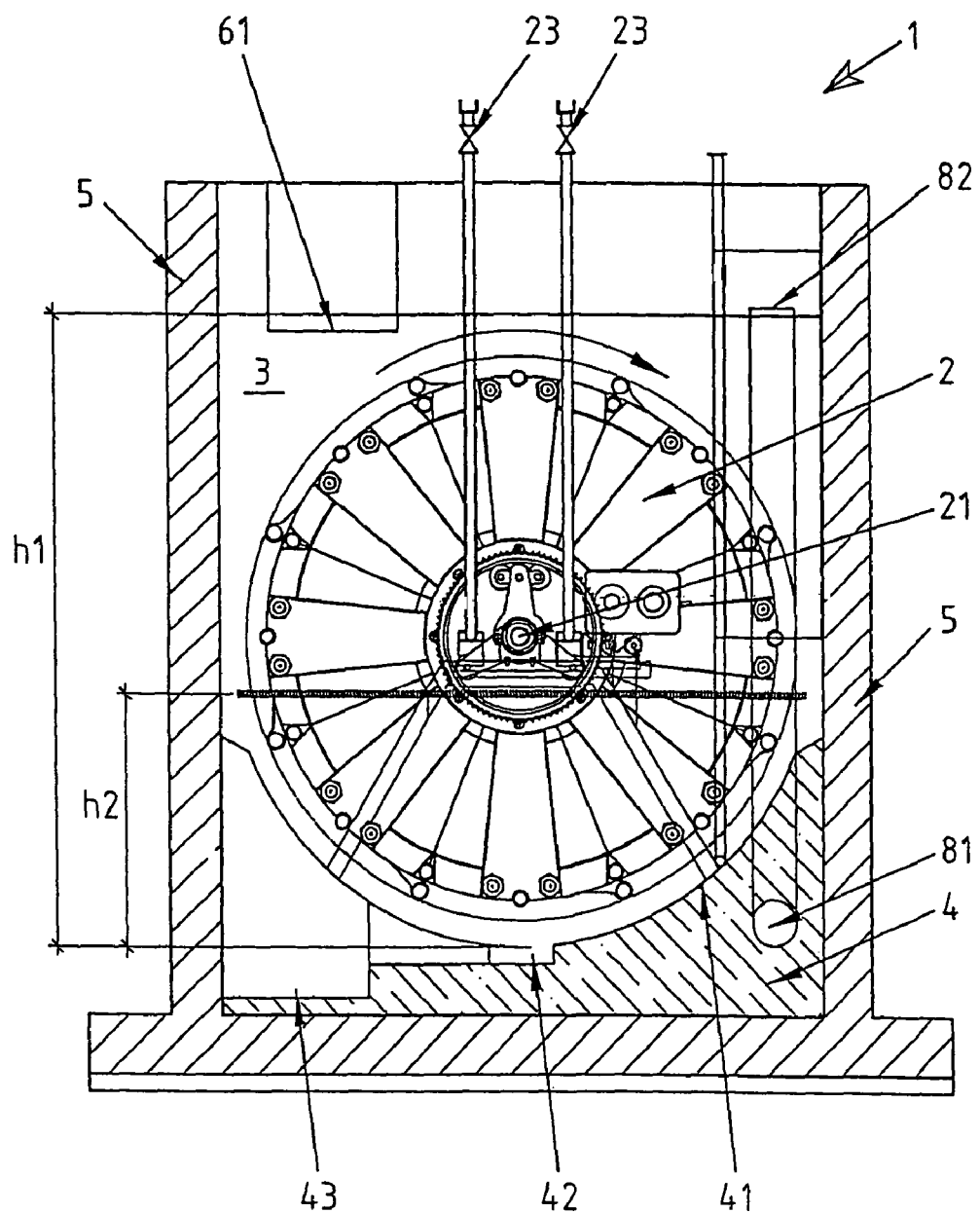
FIG. 2 a frontal view vertical to an axis of rotation of a rotating filter in a filter chamber in accordance with the invention.

FIGS. 1 and 2 illustrate, respectively, a side view and a frontal view of a filter device 1 in accordance with the invention. This comprises a rotating filter 2, which is rotatably supported in a filter chamber 3. The filter chamber 3 is formed by side walls 5, a first front wall 6a and a second front wall 6b as well as by a bottom 4. One surface of the bottom 4 is essentially designed in the shape of half a hollow cylindrical body 41. The bottom 4 comprises a drain channel 42 for emptying the filter chamber 3 and the sump of a pump 43. The rotating filter 2 is rotatably supported around an axis of rotation 21, at the end of which a suction line for permeate 22, i.e. for filtered water, is conducted through the second front wall 6b. At its other end, the axis of rotation 21 comprises a scavenging air supply 23 for the provision of air for the cleaning of the rotating filter 2 during a filtering operation.

The filter chamber 3, preferably, is arranged adjacent to a main basin, for example, an activated sludge basin 7 of a sewage treatment plant and separated from this main basin, for example, by the first front wall 6a. An upper edge of the first front wall 6a acts as an overflow 61 from the filter chamber 3 to the activated sludge basin 7. By means of a recirculation pump 8, during the filtering operation of the filter chamber 3 water is pumped into the filter chamber 3 from a bottom zone of the activated sludge basin 7 through a recirculation line 81 and over an overflow of the recirculation line 82. A height of the overflow of the recirculation line 82 is greater than a height of the overflow 61, so that during the filtering operation a water level $h_1$ situated between these two heights adjusts itself within the filter chamber 3.

Depending on the prevailing space circumstances, the filter chamber 3 may also be arranged at a greater distance from the activated sludge basin 7, wherein the overflow 61 then is replaced by an overflow line. In both cases the activated sludge basin 7 is connected with the filter chamber 3 in such a manner, that it is capable of being separated with respect to the water to be treated, respectively to a water circuit.

In a preferred embodiment of the invention, an external radius of the rotating filter 2 amounts to approx. 170 cm and an internal radius of the half of the cylindrical body 41 to approx. 180 cm. A distance between the bottom 4, respectively, the half of the hollow cylindrical body 41 and the rotating filter 2 along its bottom side therefore amounts to, for example, 5 to 20 cm, in preference to almost 10 cm. A width of the filter chamber 3 is kept as small as possible and, for example, amounts to approx. two times the range of 5 to 20 cm more than the external radius of the rotating filter. A length of the rotating filter 2 amounts to approx. 500 cm, a corresponding length of the filter chamber 3 amounts to approx. 570 cm. The length of the filter chamber 3 is also to be kept a small as possible, in order to keep the quantity of cleaning liquid required as small as possible. At the same time, however, there has to be sufficient space for the installation and maintenance of all the equipment located within the filter chamber 3.

In a normal operation, i.e. in the filtering operation of the filter device 1, the rotating filter 2 is completely submerged in the water to be filtered. A water level $h_1$ relative to the lowest point of the half of a hollow cylindrical body 41 in this amounts to approx. 380 cm. In a cleaning operation, the filter chamber 3 is filled with cleaning liquid, so that with the rotation of the rotating filter 2 all filter elements are capable of being submerged. For this purpose it is sufficient, that a level of the cleaning liquid is located somewhat below the axis of rotation 21, for example, at a height $h_2$ of approx. 150 cm.

LIST OF REFERENCE MARKS

1 Filter device
2 Rotating filter
21 Axis of rotation
22 Suction line for permeate
23 Scavenging air supply
3 Filter chamber
4 Bottom
41 Half of a cylindrical hollow body
42 Drain channel
43 Sump of the pump
5 Side wall
6a First front wall
6b Second front wall
61 Overflow
7 Activated sludge basin, main basin
8 Recirculation pump
81 Recirculation line
82 Overflow of the recirculation line

The invention claimed is:

1. A filter device for a water treatment or sewage treatment plant, comprising:
    a basin for receiving water to be filtered, and
    arranged within said basin, a rotating filter having essentially the form of a cylinder, said rotating filter having a horizontal axis of rotation,
    wherein said rotating filter is arranged in its own separate filter chamber, and that a bottom of said filter chamber is designed as following a contour of said rotating filter, and
    wherein said filter chamber is separably connected with an activated sludge basin, and
    further comprising a pump for the provision of liquid from said activated sludge basin into said filter chamber over a first overflow, and comprising a second overflow situated at a lower level for the return flow of the liquid from said filter chamber into said activated sludge basin.

2. The filter device of claim 1, wherein the bottom of said filter chamber approximately forms half of a hollow cylindrical body.

3. The filter device of claim 2, wherein the axis of rotation of said rotating filter at least approximately coincides with one cylinder axis of the half of a hollow cylindrical body.

4. The filter device of claim 3, wherein a front wall of said filter chamber running vertically to the axis of rotation of said rotating filter comprises a means for the sucking off of permeate.

5. The filter device of claim 1, wherein said filter chamber is arranged adjacent to said activated sludge basin and is separated from said activated sludge basin by a wall with an overflow.

6. The filter device of claim 1, wherein the bottom of said filter chamber comprises means for the separate emptying of said filter chamber without the emptying of said activated sludge basin.

7. The filter device of claim 1, further comprising one or more rotating filters, wherein every rotating filter is respectively arranged within its own dedicated separate filter chamber.

8. A method for the periodic cleaning of a filter device comprising the steps of:
- separation of a filter chamber from other water conducting parts of an installation,
- pumping-off or draining of water present in said filter chamber, thereby emptying the filter chamber,
- filling of said filter chamber with cleaning liquid up to approximately just below an axis of rotation of a rotating filter,
- rotation of said rotating filter,
- pumping-off or draining of the used cleaning liquid in said filter chamber, thereby emptying the filter chamber, and
- re-establishment of the connections to the other water conducting parts of the installation.

9. The method of claim 8, wherein in an intermediate step said rotating filter is put into rotation for a mechanical rough cleaning.

\* \* \* \* \*